No. 867,416. PATENTED OCT. 1, 1907.
F. W. RICHEY.
ELECTRICAL CONDUCTOR.
APPLICATION FILED FEB. 10, 1904.

2 SHEETS—SHEET 1.

Witnesses:
George H. Tilden.
Helen Alford

Inventor:
Frank W. Richey,
by Allen S. Davis
Att'y.

No. 867,416. PATENTED OCT. 1, 1907.
F. W. RICHEY.
ELECTRICAL CONDUCTOR.
APPLICATION FILED FEB. 10, 1904.

2 SHEETS—SHEET 2.

Witnesses:
George H. Tilden
Helen Oxford

Inventor:
Frank W. Richey,
by Albert G. Davis
Att'y.

UNITED STATES PATENT OFFICE.

FRANK W. RICHEY, OF SCHENECTADY, NEW YORK, ASSIGNOR TO GENERAL ELECTRIC COMPANY, A CORPORATION OF NEW YORK.

ELECTRICAL CONDUCTOR.

No. 867,416.	Specification of Letters Patent.	Patented Oct. 1, 1907.

Application filed February 10, 1904. Serial No. 192,903.

*To all whom it may concern:*

Be it known that I, FRANK W. RICHEY, a citizen of the United States, residing at Schenectady, county of Schenectady, State of New York, have invented certain new and useful Improvements in Electrical Conductors, of which the following is a specification.

My present invention relates to improvements in the manufacture and construction of electrical conductors such as rail bonds and the like.

More particularly my invention relates to an electrical conductor having a body composed of a flexible stranded conductor and one or more solid terminal portions secured to the flexible body portion.

The various features of novelty which characterize my invention will be pointed out with particularity in the claims annexed to and forming a part of this specification. For a better understanding of my invention, however, reference may be made to the accompanying drawings and description in which I have illustrated and described several embodiments of my invention.

Figure 1:
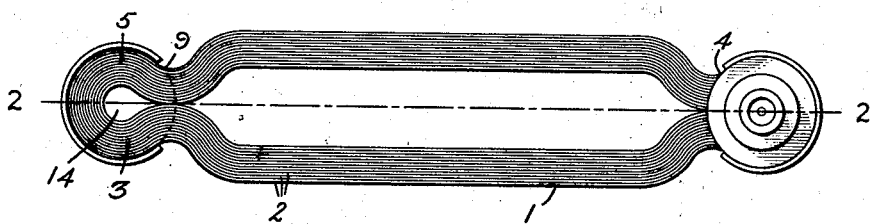
Figure 2:
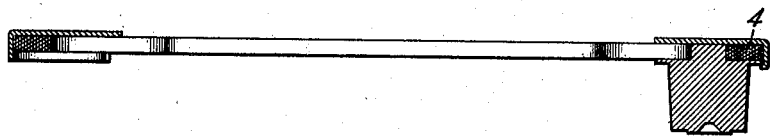
Figure 3:
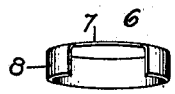
Figure 5:
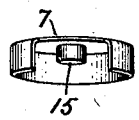
Figure 7:
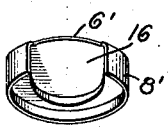
Figure 4:
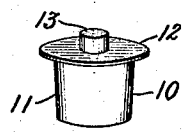
Figure 6:
Figure 8:
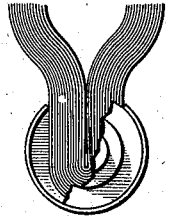
Figure 10:
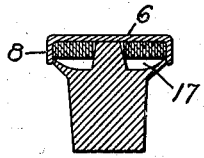
Figure 9:
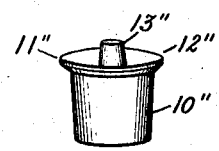
Figure 11:
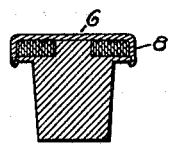
Figure 12:
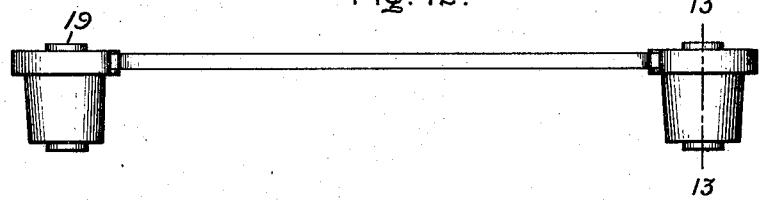
Figure 13:
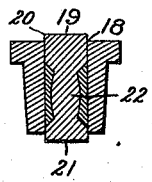
Figure 14:
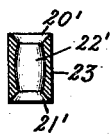
Figure 15:

Of the drawings, Figure 1 is a plan view showing a partially constructed rail bond; Fig. 2 is a section taken on the line 2 2 of Fig. 1; Fig. 3 is a perspective view of one form of cap piece or blank and Fig. 4 is a perspective view of a coöperating terminal blank; Fig. 5 is a perspective view of another form of cap piece, and Fig. 6 is a perspective view of a terminal blank which may be employed in conjunction therewith; Fig. 7 is a perspective view showing a third form of cap piece, and Fig. 8 is a plan view showing this form of cap piece with a coöperating terminal blank and a portion of the flexible body of the conductor assembled together, parts being broken away; Fig. 9 is a perspective view showing a third form of terminal blank, and Fig. 10 is a section showing a terminal body blank, coöperating cap piece and flexible conductor assembled prior to any compression; Fig. 11 is a view similar to Fig. 10 after the parts have received the preliminary compression; Fig. 12 is an elevation showing a completed rail bond; Fig. 13 is a section taken on the line 13 13 of Fig. 12; Fig. 14 is a sectional elevation of the bushing which surrounds the expanding pin, and Fig. 15 is an elevation of said bushing.

In all of the forms of my invention which I have illustrated in the drawings the body 1 of the rail bond is composed of a number of strands 2 of a ribbon shaped conductor formed out of copper or the like. Preferably the body is composed of a number of convolutions of a single strip or ribbon.

In the form of my invention shown in Figs. 1 and 2 opposite ends 3 and 4 of the stranded body 1 are formed into substantially circular loops 5. Each loop 5 fits in a cap shaped blank or piece 6. The cap shaped blank 6 comprises a disk portion 7 and a cylindrical flange portion 8 and is preferably made out of sheet copper or the like which is stamped or pressed into shape. The flange portion 8 is of a depth somewhat greater than the width of the strips as clearly shown in the drawings. The flange is cut away at 9 to receive the neck portion which connects the loop 5 with the main portion of the conductor 1.

A terminal blank 10, see Fig. 4, having a tapered main or body portion 11, is provided at its upper and larger end with a radially extending flange portion 12, the outer diameter of which is equal to the internal diameter of the cylindrical flange 8. The upper end of the body 11 and flange 12 close the open end of the chamber formed by the disk 7 and flange 8 of the cap member 6. A substantially cylindrical projection 13 extends axially from the upper end of the body 11. This projection enters the space 14 formed in the center of the loop 5.

The blank 10 may be formed out of a suitable material such as copper preferably worked into the desired shape by drop forging.

After the parts are assembled they are pressed cold in dies or otherwise to so force the parts together that the walls of the chamber formed by the top of the body 11 and flange 12, and disk 7 and flange 8 of the cap 6 and the metal contained within said chamber are compacted into a substantially solid mass from which all air is excluded. By this action the outer periphery of the flange 12 is forced into the flange 8, the lower end of which will be upset somewhat as shown in Fig. 2. This locks the cap 6 and blank 10 firmly together.

After compressing the parts together cold in the manner described the ends of the rail bond blank thus formed are subjected to a welding heat and are welded together by the application of suitable pressure as in a drop forge. As the preliminary compression of the parts into a solid mass when cold excludes all air, the heating of the blank will not result in the formation of oxids between the surfaces which are to be welded together. This allows a perfect weld to be made. It may in some cases be desirable to employ special steps to remove dirt, oxids or other impurities from the surfaces of the parts to be welded before assembling them.

Instead of forming the blank 10 with the projection 13 the upper surface of the blank may be plane as shown in Fig. 6. With this construction a projection 15 may be centrally disposed on the under side of the disk 7 of the cap piece as shown in Fig. 5.

In some cases the end of the flexible body 1 may be forced together in such manner as to leave no recess 14 as shown in Fig. 8. With this form of the loop 5 a cap blank 6′ (Fig. 7) may be employed having a recess 16 formed in its top portion, shaped to receive the end of the stranded conductor and having a depth equal to the width of the layers or strands. The flange 8′ forming the outer periphery of the cap in this case may be of a depth somewhat greater than the thickness of the disk shown in Fig. 6. It will be understood that in this as in all others forms of my invention which I describe in this specification, the parts are first compressed together cold and then welded as before described.

In Fig. 9 I have shown a blank 10″ in which the upper surface of the body 11″ and flange 12″ are dished. A conical projection 13″ extends upwardly from the body 11″ in line with the axis of the blank. The parts are so proportioned that when first assembled they appear as shown in Fig. 10 with an annular space 17 formed between the loop 5, projection 13 and upper surface of the body 11″ and flange 12″. When the parts are thereafter compressed together cold the outer edge of the flange 12″ is forced into the flange 8 of the cap 6 which is preferably of the construction shown in Fig. 3. At the same time the conical projection 13″ is upset and caused to assume a cylindrical shape. With this construction the parts may be compacted together very solidly.

After the parts are welded together a hole 18 may be drilled axially through the solid terminal portion in which an expanding member 19 is placed as shown in Fig. 13. The expanding member 19 is preferably formed out of steel or the like and comprises two cylindrical end portions 20 and 21 of a diameter to fit the hole 18 connected by tapered end portions to a portion 22 of reduced diameter. The portion 22 is preferably barrel shaped as shown and is softer than the ends which may be hardened.

A bushing or sleeve 23, which may be split as shown and formed out of brass, copper or the like, surrounds the reduced portion 22. The sleeve or bushing which may be formed out of brass, copper or the like is so proportioned that it fills the space between the pin 19 and the walls of the hole 18, having a barrel shaped recess 22′ in which the portion 22 is located, and conical recesses 20′ and 21′ in which the conical ends of the portions 20 and 21 are located. The bushing may be formed out of bar metal rolled to have the necessary cross section. Strips may be cut from the bar of a proper length and bent about the reduced portion of the pin member 19.

When pressure is applied to the ends of the pin 19 the portion 22 will be upset and the bushing 23 will be expanded. This will cause the body of the terminal to be forced firmly into contact with the wall of the hole or recess formed for the purpose in the rail or other conducting member to which it is connected.

What I claim as new and desire to secure by Letters Patent of the United States, is:

1. A rail bond comprising a terminal member formed with a projection at one end, a stranded conductor looped about said projection and a sheet metal cap piece formed with a flange, the top of said cap piece covering one side of the looped end of the flexible conductor and the flange embracing the edges of the end of the stranded conductor and a portion of said member.

2. The method which consists in looping a stranded conductor about a projection at one end of a terminal blank, then covering the top and sides of the looped conductor with a sheet metal cap blank, thereafter compressing the parts together cold to form a substantially solid mass from which all air is excluded and then welding the parts together.

3. In combination, a main terminal member, and a cap blank comprising a portion substantially parallel to the end of said terminal member and having a flange extending part way about and upset upon the periphery of said terminal blank, one of said members being formed with a projection about which a stranded conductor may be looped.

4. A rail bond comprising a terminal member having a flange and a centrally formed projection at one end, a stranded conductor looped about said projection and a sheet metal cap piece covering the looped end of said stranded conductor and a portion of the terminal member, the edge of the flange being embedded in the cap piece.

5. The method which consists in looping a stranded conductor about a projection extending centrally from the dished end of a terminal member, covering the top and sides of the looped conductor and a portion of the terminal member with a sheet metal cap piece, compressing the parts together cold to form a substantially solid mass from which all air is excluded and in such manner as to take the dish out of the end of the terminal member and embed its edges in the cap piece.

6. In combination for use in the manufacture of an electrical conductor comprising a stranded body portion and a solid terminal portion, a cap shaped blank, and a terminal stud having a flange formed at one end of a diameter to fit in said cap blank, the end of the stud and flange being concaved.

7. In the terminal of an electrical conductor, an expanding device comprising a pin having end portions connected by an intermediate reduced portion, and a split bushing surrounding said reduced portion.

8. In the terminal of an electrical conductor, an expanding device comprising a pin having end portions connected by an intermediate reduced portion and a split bushing surrounding said reduced portion, the outer diameter of said bushing being equal to the diameter of said end portions.

9. In the terminal of an electrical conductor, an expanding device, comprising a pin having two end portions and a reduced barrel shaped intermediate portion, and a split bushing closely embracing said barrel shaped portion with its outer surface flush with the outer surfaces of said end portions.

10. In the terminal of an electrical conductor, an expanding device comprising a pin having end portions connected by an intermediate reduced portion, and a bushing surrounding said reduced portion.

11. In the terminal of an electrical conductor, an expanding device comprising a pin having cylindrical portions connected by an intermediate reduced portion, and a bushing embracing said reduced portion, the outer surface of said bushing being flush with the outer surface of said cylindrical end portion.

12. In combination, for use in the manufacture of an electrical conductor comprising a stranded body part and a solid terminal part, a terminal stud having a radial flange, and a cap shaped blank adapted to embrace a portion of the stranded body part and a portion of the periphery of the terminal stud flange.

13. The method of securing together a stranded conductor and a slotted terminal blank which consists in inclosing a portion of the terminal and a portion of the stranded conductor in a cup shaped sheet metal blank, thereafter compressing the parts together cold to form a substantially solid mass from which all air is excluded, and then welding the parts together.

In witness whereof I have hereunto set my hand this 9th day of February, 1904.

FRANK W. RICHEY.

Witnesses:
BENJAMIN B. HULL,
HELEN ORFORD.